（12) United States Patent
Eguchi et al.

(10) Patent No.: US 6,256,275 B1
(45) Date of Patent: Jul. 3, 2001

(54) DISK REPRODUCING APPARATUS AND METHOD OF DETECTING VIBRATION

(75) Inventors: Toyokazu Eguchi, Kawasaki; Satoshi Sakuma, Yokohama; Hayato Masubuchi, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/265,812

(22) Filed: Mar. 10, 1999

(30) Foreign Application Priority Data

May 1, 1998 (JP) .................................................. 10-122295

(51) Int. Cl.$^7$ ...................................................... G11B 7/09
(52) U.S. Cl. .................................... 369/44.32; 369/44.28
(58) Field of Search ............................ 369/44.32, 44.27, 369/44.28, 44.29, 44.35, 44.34, 44.25, 47, 54, 58

(56) References Cited

U.S. PATENT DOCUMENTS 4,703,468 * 10/1987 Baba et al. ...................... 369/44.32
5,202,872 * 4/1993 Shinada .............................. 369/44.32
6,028,826 * 2/2000 Yamamoto et al. .......... 369/44.32 X

FOREIGN PATENT DOCUMENTS 10-69709    3/1998 (JP) .

\* cited by examiner

Primary Examiner—Muhammad Edun
(74) Attorney, Agent, or Firm—Oblon, Spivak, McClelland, Maier & Neustadt, P.C.

(57) ABSTRACT

When a disc is driven at a low speed, the number of tracks crossed by a beam spot of an optical pickup (3) is determined as the number of crossing tracks corresponding to an amount of mass eccentricity of the disc. If this number of crossing tracks exceeds a first threshold value, the disc is rejected as a non-conforming disc. When the disc is driven at a high speed, the number of tracks crossed by the beam spot is determined, a value remaining by subtracting the number of crossing tracks at the low speed from the number of crossing tracks at the high speed is determined as an amount of vibration produced owing to a mass eccentricity of the disc. Thus, a disc drive which can make an extremely precise detection of a magnitude of vibration resulting from the mass eccentricity of the disc without using a sensor component for detecting the vibration can be provided.

10 Claims, 4 Drawing Sheets

DISK REPRODUCING APPARATUS AND METHOD OF DETECTING VIBRATION

BACKGROUND OF THE INVENTION

1. Field of the Invention

The present invention relates to a disc reproducing apparatus for reproducing an optical disc such as a CD-ROM or a DVD and a method for detecting its vibration.

2. Description of the Related Art

Recently, the speed-up (improvement of the reading speed of data) of disc drives for reproducing an optical disc such as a CD-ROM or a DVD is remarkable. By speeding up the disc drive, when a disc having a mass eccentricity (disc with its center of gravity deviated from the center of rotation) is reproduced by such a disc drive, the vibration generated in synchronization with the rotations of the disc becomes a prominent problem. This vibration is a factor to deteriorate the tracking performance of an optical pickup, resulting in lowering the data reading performance. The vibration and noise which leak out of the drive increase, and the use environment is remarkably degraded.

Conventionally, in order to suppress vibration generated when the disc having the mass eccentricity is reproduced, the vibration of the optical pickup and the like is directly detected by a sensor using an oscillator, and for example, a reproducing speed (transfer rate) is lowered if the vibration exceeding a predetermined value is detected.

But, such a method requires, in addition to a vibration sensor, many additional components such as a circuit for A/D conversion of the output from the vibration sensor to input a controller, causing a problem of increasing assembling man-hours and costs. Since a piezoelectric element type impact sensor is sensitive to surrounding electromagnetic noise, special consideration must be given to the mounting method and the use. In this connection, the cost is increased. In addition, these vibration sensors have a problem of having a detection error due to deviation or the like of parts.

OBJECTS AND SUMMARY OF THE INVENTION

It is an object of the invention to provide a disc reproducing apparatus which can detect very accurately the magnitude of vibration caused by the mass eccentricity of a disc when it is driven at a high speed, and a method for detecting the vibration.

It is another object of the invention to provide a disc reproducing apparatus, which can detect very accurately the magnitude of vibration caused by the mass eccentricity of a disc without using any sensor part for detecting the vibration, and a method for detecting the vibration.

It is still an object of the invention to provide a disc reproducing apparatus which can determine an amount of mass eccentricity of a disc with great accuracy.

In order to achieve the objects of the invention, the disc reproducing apparatus according to the invention comprises an optical pickup which reads out information recorded on a disc as an RF signal and generates a tracking error signal; and a vibration detection means which detects vibration of the disc based on the RF signal and the tracking error signal output from the optical pickup.

According to the invention, the vibration detection means includes a displacement detection means which detects, based on the RF signal and the tracking error signal output from the optical picking, a first displacement of the optical pickup and the disc produced in a direction of the disc surface when the disc is driven at a first speed and a second displacement of the optical pickup and the disc produced in a direction of the disc surface when the disc is driven at a second speed which is faster than the first speed; and a calculation means which determines, as vibration resulting from the mass eccentricity of the disc, a difference between the first displacement and the second displacement respectively detected by the displacement detection means.

The magnitude of vibration caused when the disc is driven at a high speed is a sum of the amount of mass eccentricity of the disc and the vibration caused by the mass eccentricity and the high-speed driving of the disc. When the disc is driven at a low speed, e.g., 1×speed, an amount of vibration caused by the mass eccentricity of the disc can be considered to be substantially zero. Therefore, only the vibration component caused by the mass eccentricity of the disc can be extracted by subtracting the first displacement detected at the low speed driving from the second displacement detected at the high speed driving.

Thus, the disc-reproducing apparatus according to the invention uses the RF signal and the tracking error signal output from the optical pickup to detect the vibration caused by the mass eccentricity of the disc. Consequently, a sensor component for detecting vibration can be eliminated, and the problem that the vibration could not be detected with great accuracy because of the sensitivity of the sensor component and the deviation of the mounting position can be remedied.

According to the invention, the first displacement detected when the disc is driven at a low speed, e.g., 1×speed, substantially does not include the vibration component caused by the mass eccentricity of the disc. Therefore, the present invention judges the first displacement as the amount of mass eccentricity of the disc and can automatically reject the disc, which has the amount of mass eccentricity exceeding a predetermined value, as a nonconforming disc.

DETAILED DESCRIPTION OF THE PREFERRED EMBODIMENT

An embodiment of the invention will be described with reference to the drawings.

Figure 1:
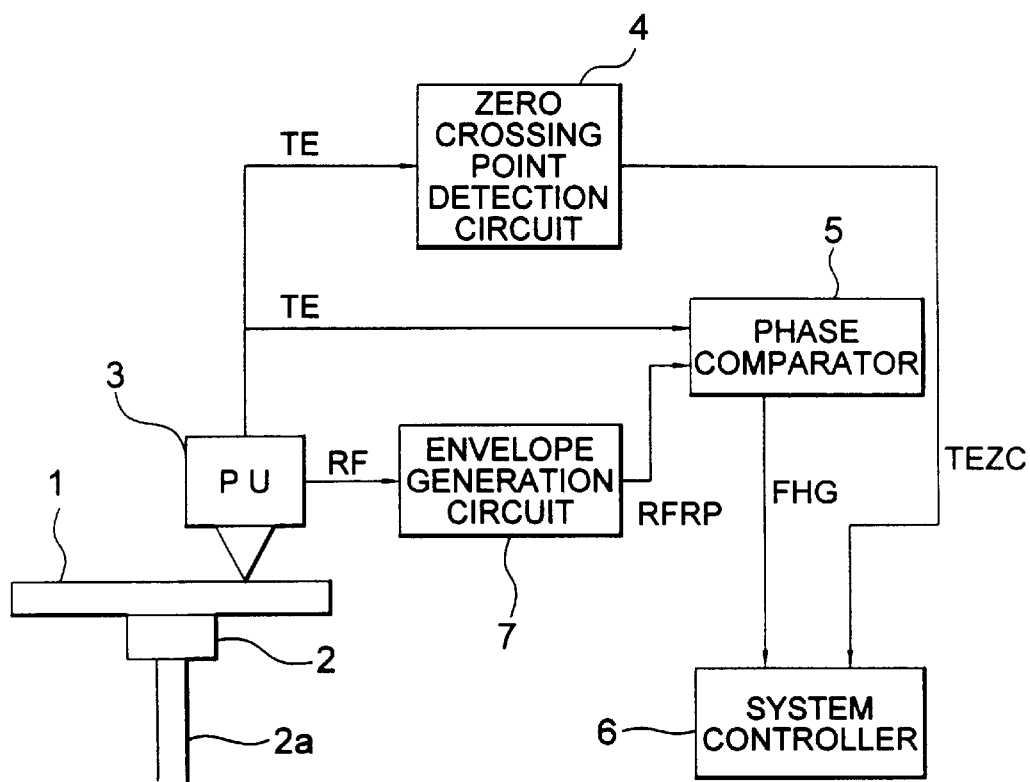
FIG. 1 is a block diagram showing the main configuration of a CD-ROM drive of an embodiment according to the present invention.

As shown in FIG. 1, a CD-ROM drive of this embodiment has, as means for driving a CD-ROM (hereinafter referred to as the disc) 1, a spindle motor (not shown), a turn table 2 fixed to a motor shaft 2a of the spindle motor, and a clamper for clamping the center hole portion of the disc 1 with the turn table 2.

An optical pickup (PU) 3 is means for reading out data from the disc 1 by irradiating a laser beam onto a record surface of the disc 1 which is driven by the disc driving means and detecting the reflected light. The optical pickup 3 is translated in a radial direction along the record surface of the disc 1.

Each mechanism which achieves the means for driving the disc and the means for reading out data from the disc is mounted on a mechanical chassis which is supported in a floating structure by means of an antivibration member such as damper rubber in a main housing of the CD-ROM drive. This CD-ROM drive also has a disc accommodation body called the tray or drawer and a loading mechanism for translating and driving the disc accommodation body. The disc accommodation body is means for moving the disc, which is accommodated in the disc accommodation body, into and out of the drive.

The optical pickup 3 reads out information recorded on the disc 1 as an RF signal and also generates a tracking error signal (TE) corresponding to the amount of displacement between the track center and the laser beam spot on the record surface of the disc 1. When the disc is reproduced, the tracking error signal (TE) is sent to a servo processing circuit (not shown) to perform tracking servo. The tracking error signal (TE) is supplied to a zero crossing point detector circuit 4 and a phase comparator 5 respectively so to detect the vibration.

The zero crossing point detector circuit 4 detects a zero crossing point of the tracking error signal (TE) to generate a tracking error zero crossing signal (TEZC) and outputs the tracking error zero crossing signal (TEZC) to a system controller 6. The tracking error zero crossing signal (TEZC) is a signal that a logical level is reversed for every detected zero crossing point.

The RF signal output from the optical pickup 3 is inputted a demodulation system (not shown) when the disc is reproduced, and inputted an envelope generation circuit 7 when the vibration is detected. The envelope generation circuit 7 determines a difference between the peak and the bottom of the RF signal and generates an envelope signal A phase comparator 5 compares a phase between the envelope signal (RFRP) output from the envelope generation circuit 7 and the tracking error signal (TE) to generate a phase difference signal (FHG) and outputs this generated phase difference signal (FHG) to the system controller 6.

The system controller 6 performs the following vibration detection based on the phase difference signal (FHG) from the phase comparator 5 and the tracking error zero crossing signal (TEZC) from the zero crossing point detector circuit 4.

The vibration to be detected is vibration caused by the mass eccentricity of the disc when it is driven at a high speed. Therefore, the vibration may be detected every time the discs are exchanged, e.g., before starting to reproduce the original disc.

Figure 2:
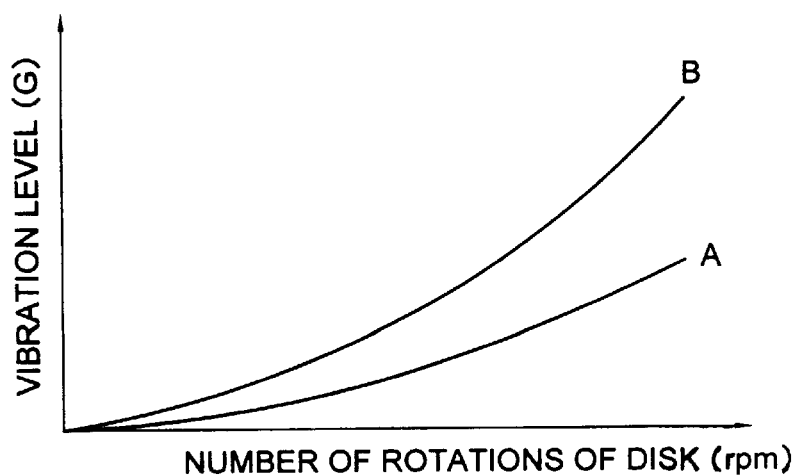
FIG. 2 is a chart showing the correlation between the number of rotations and the vibration level of a disc having a mass eccentricity.
Figure 3:
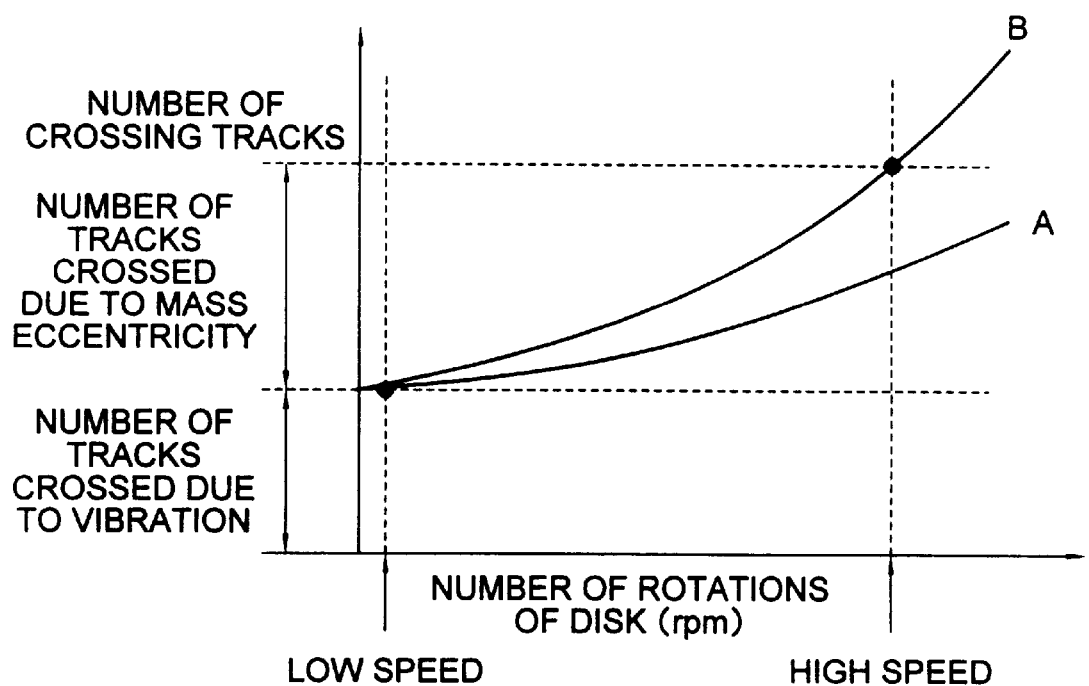
FIG. 3 is a chart showing the relation between the number of rotations of a disc and the number of crossing tracks.

FIG. 2 shows the correlation between the number of rotations of a disc having a mass eccentricity and its vibration level. In FIG. 2, A indicates the correlation of a disc having a relatively small mass eccentricity and B indicates the correlation of a disc having a mass eccentricity larger than that of A. It is seen that the vibration level becomes high as the number of rotations of the disc increases and also becomes high when the disc has a larger amount of mass eccentricity. This vibration level can be replaced with a relative displacement of the optical pickup and the disc in a radius direction of the disc, e.g., the number of tracks crossed by the beam spot of the optical pickup. FIG. 3 shows the relations between the number of rotations of the disc and the number of crossing tracks of discs A and B respectively.

Figure 4:
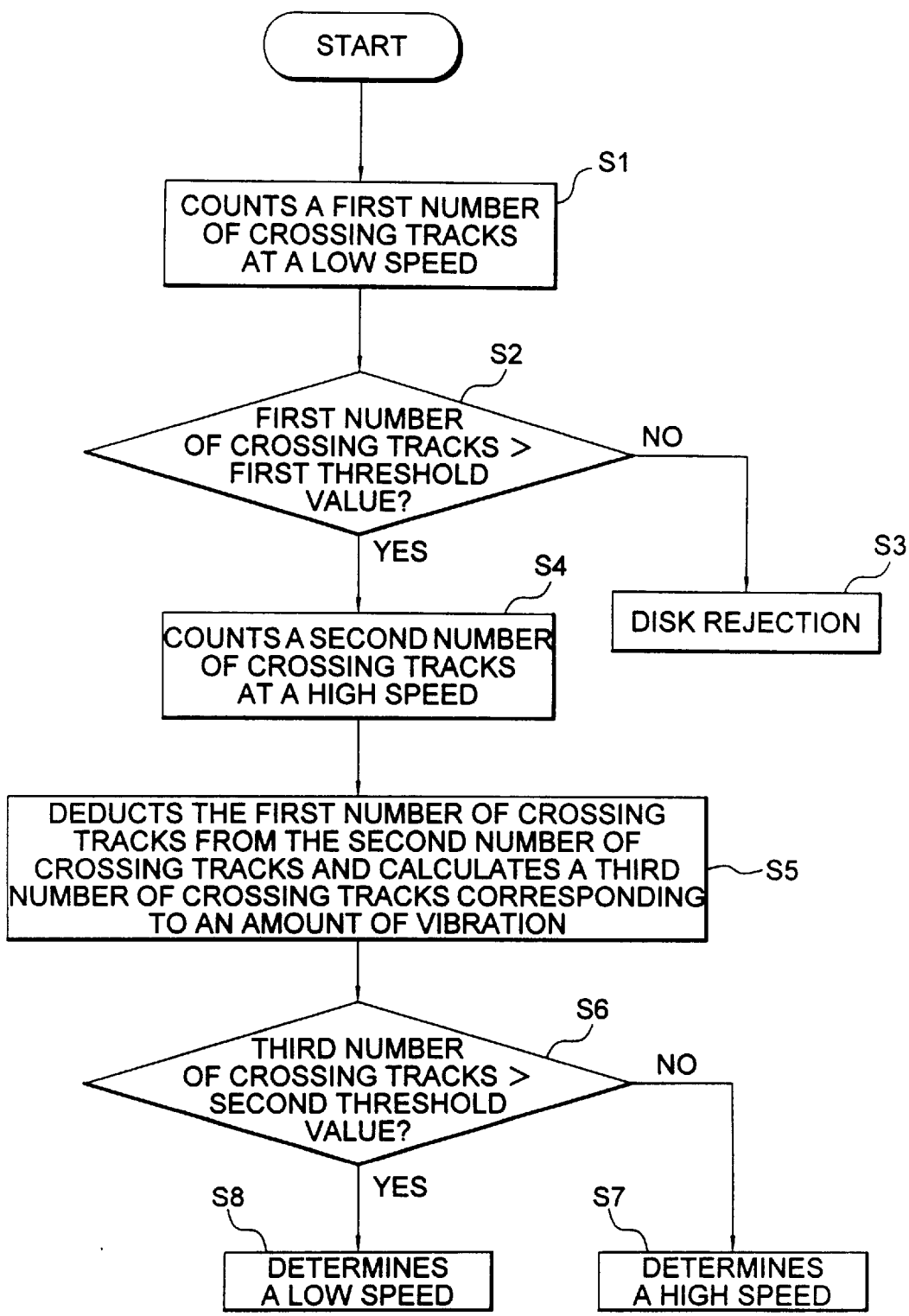
FIG. 4 is a flowchart showing a procedure of detecting the vibration by the CD-ROM drive shown in FIG. 1.

A procedure of detecting the vibration by the CD-ROM drive of this embodiment will be described with reference to the flowchart shown in FIG. 4

First, the disc is driven at a low speed (e.g., 1×speed), and the number of tracks crossed by the beam spot of the optical pickup 3 is determined (step 1). When driving the disc at a low speed, vibration resulting from the mass eccentricity of the disc is so small that the number of crossing tracks measured while driving the disc at this low speed can be considered to be the number of crossing tracks (a first number of crossing tracks) corresponding to the amount of mass eccentricity of the disc.

Then, it is judged whether the first number of crossing tracks which corresponds to the amount of mass eccentricity of the disc exceeds a first threshold value (step 2). When the first number of crossing tracks exceeds the first threshold value, this disc is rejected as a nonconforming disc (step 3). The rejecting process is performed by, for example, a method of notifying a user by giving a message or the like about the rejection of the disc, a forced ejection of the disc from the drive or the like.

If the first number of crossing tracks is below the first threshold value, the disc is driven at a high speed, e.g., the highest speed of the drive, to determine the number of tracks (the second number of crossing tracks) crossed by the beam spot of the optical pickup 3 at the time (step 4). When driving the disc at a high speed, the vibration caused by the mass eccentricity of the disc becomes large, so that the second number of crossing tracks measured at the high speed driving is obtained by adding the vibration caused by the mass eccentricity of the disc to the amount of mass eccentricity of the disc.

Therefore, the first number of crossing tracks is subtracted from this second number of crossing tracks to determine a remaining value as the number of crossing tracks (a third number of crossing tracks) corresponding to an amount of vibration generated owing to the mass eccentricity of the disc (step 5).

This third number of crossing tracks which corresponds to the amount of vibration is compared with a predetermined second threshold value (step 6), and when the third number of crossing tracks is not more than the second threshold value, the reproduce speed is set to a high speed (step 7). When the third number of crossing tracks exceeds the second threshold value, the disc is considered as a disc which cannot be reproduced at the high speed, and the reproduce speed is set to a low speed (step 8).

A specific calculation method of the number of crossing tracks will be described.

Figure 5:
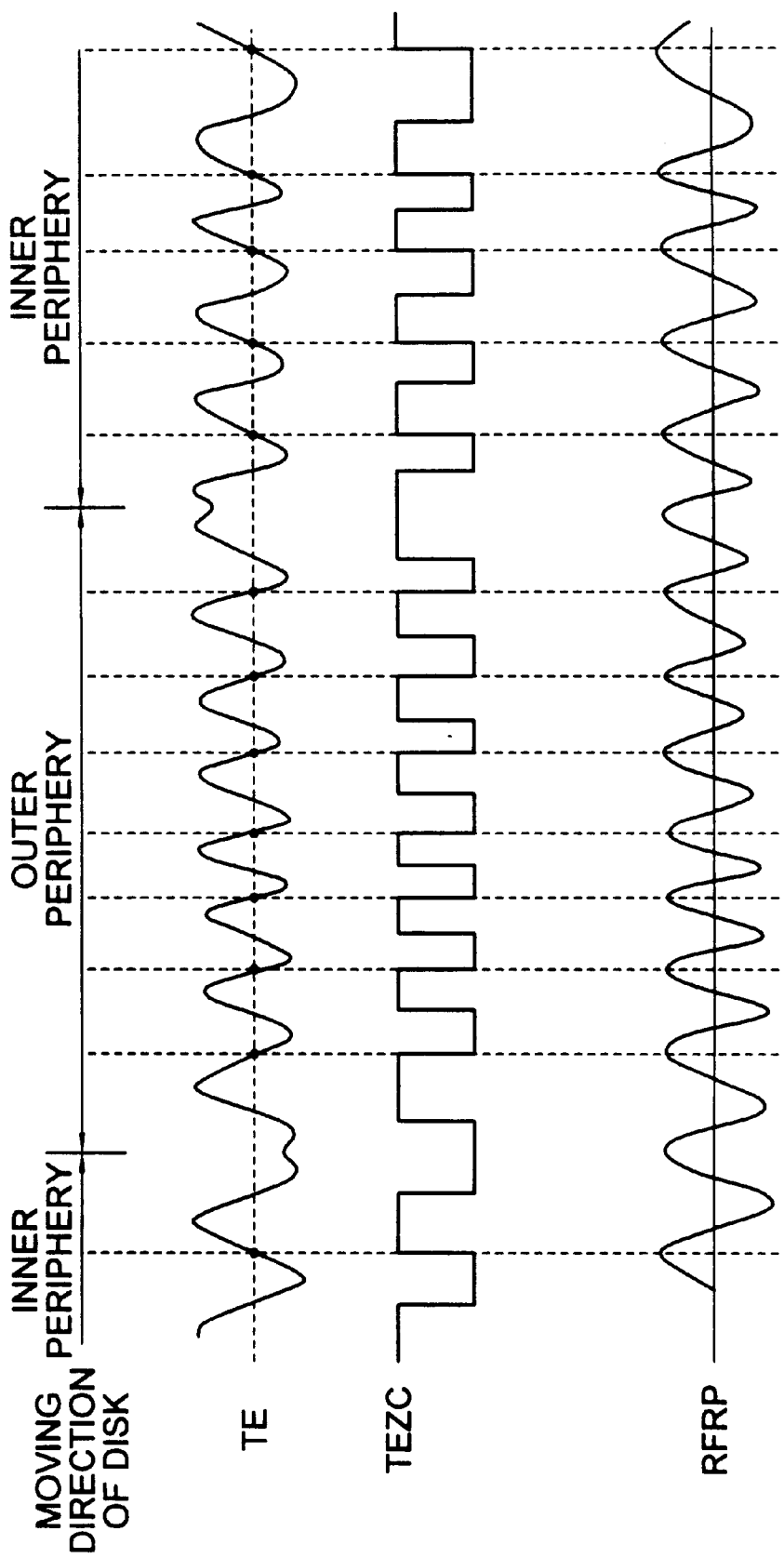
FIG. 5 is a chart showing waveforms of the respective blocks shown in FIG. 1.

FIG. 5 is a diagram showing waveforms of output signals of the respective blocks shown in FIG. 1. In FIG. 5, TE is a tracking error signal, TEZC is a tracking error zero crossing signal output from the zero crossing point detector circuit 4, and RFRP is an envelope signal output from the envelope generation circuit 7.

The system controller 6 drives the disc 1 at a low speed (e.g., 1×speed) with the focus servo ON and the tracking servo OFF and fixes the positions of the optical pickup 3 and an objective lens. The RF signal is supplied from the optical pickup 3 to the envelope generation circuit 7 while maintaining the above-described state. The envelope generation circuit 7 generates the envelope signal RFRP from the input RF signal and enters it into the phase comparator 5. The phase comparator 5 compares the phase of the RF signal input directly from the optical pickup 3 and the phase of the envelope signal RFRP input from the envelope generation circuit 7 and judges a direction of the disc (an inner peripheral direction or outer peripheral direction of the disc) moved by the vibration from the determined phase difference.

The moving direction of the disc can be judged in terms of the polarity of the envelope signal RFRP at a point where the tracking error zero crossing signal TEZC rises as shown in FIG. 5. Specifically, it is judged that when the polarity of the envelope signal RFRP at a point where the tracking error zero crossing signal TEZC rises is positive, the direction in which the disc moves is the inner peripheral direction, and when it is negative, the direction in which the disc moves is the outer peripheral direction.

The system controller 6, based on the judgment made as described above, counts the number of edges of the tracking error zero crossing signal TEZC for a period during which the disc is started to move in the outer or inner peripheral direction and moved in the opposite direction as a first number of crossing tracks and records the counted number.

The system controller 6 then compares the first number of crossing tracks with the predetermined first threshold value as described above and, when the first number of crossing tracks exceeds the first threshold value, the disc is rejected as it has an amount of mass eccentricity not falling in the specified standard range.

The second number of crossing tracks at a high speed is also calculated in the same way. After calculating the second number of crossing tracks, the system controller 6 determines a difference (a third number of crossing tracks) between the second number of crossing tracks and the first number of crossing tracks, as an amount of vibration excluding the amount of mass eccentricity of the disc.

The CD-ROM drive of the embodiment described above can use the tracking error signal and RF signal obtained by the optical pickup 3 to detect the vibration caused by the mass eccentricity of the disc with great accuracy. Because a sensor component for detecting the vibration is not required, various problems such as a cost increase resulting from the increase of the number of sensor components, erroneous detection of vibration due to deviation of the sensor components, and a performance drop due to the erroneous detection of vibration can be remedied.

Besides, the CD-ROM drive of this embodiment can determine the first number of crossing tracks counted at a low speed as a value corresponding to the amount of mass eccentricity of the disc and can automatically make an extremely precise identification of the disc having a large amount of mass eccentricity.

In the embodiment described above, the switching of reproducing speed between two stages, namely the low speed and the high speed, was described to facilitate the understanding of the invention. But the invention can also be applied to a disc drive of which speed can be switched among three or more multistage speeds.

The high speed selected when vibration is detected is not necessarily required to be the highest speed of the CD-ROM drive and is preferably determined as required so that an extremely precise detection of an amount of vibration can be made according to conditions such as the vibration characteristic of an antivibration member such as damper rubber and the vibration characteristic of the optical pickup 3.

The disc drive provided with the function to reproduce a CD-ROM was described above, but the present invention can also be applied to a variety of disc drives, e.g., a DVD drive, a rewritable disc drive and other disc drives of which speed is changeable.

What is claimed is:

1. A disc reproducing apparatus, comprising:
    an optical pickup for reading out information recorded on a disc as an RF signal and generating a tracking error signal; and
    a vibration detection means for detecting vibration generated, when the disc is driven, including:
        displacement amount detection means which detects, based on the RF signal and the tracking error signal, a first amount of displacement of the optical pickup and the disc produced in a direction of the disc surface when the disc is drive at a first speed and a second amount of displacement of the optical pickup and the disc produced in a direction of the disc surface when the disc is driven at a second speed which is faster than the first speed; and
        calculation means which determines, as vibration caused by the mass eccentricity of the disc, a difference between the first amount of displacement and the second amount of displacement respectively detected by the displacement amount detection means.

2. The disc reproducing apparatus according to claim 1, further comprising disc judgment means for judging the disc to be abnormal based on the first amount of displacement detected by the displacement amount detection means.

3. The disc reproducing apparatus according to claim 2, further comprising means for compulsorily ejecting the disc when the disc is judged abnormal by the disc judgment means.

4. The disc reproducing apparatus according to claim 2, further comprising means for notifying a user that the disc was judged abnormal by the disc judgment means.

5. The disc reproducing apparatus according to claim,1, wherein the displacement amount detection means includes:
    zero crossing point detection means which detects a zero crossing point of the tracking error signal output from the optical pickup to output a tracking error zero crossing signal;
    envelope signal generation means which generates an envelope signal of the RF signal output from the optical pickup;
    phase detection means which generates a phase difference signal of the envelope signal output from the envelope signal generation means and the tracking error signal; and
    calculation means which calculates the first amount of displacement or the second amount of displacement based on the tracking error zero crossing signal output from the zero crossing point detection means and the phase difference signal output from the phase detection means.

6. A method of detecting vibration of a disc reproducing apparatus, comprising:
    a step to read out information recorded on a disk as an RF signal by an optical pickup and to generating a tracking error signal; and
    a step to detect vibration produced, when the disc is driven, including:
        a step to detect a first amount of displacement of the optical pickup and the disc produced in a direction of the disc surface when the disc is driven at a first speed, based on the RF signal and the tracking error signal and a second amount of displacement of the optical pickup and the disc produced in a direction of the disc surface when the disc is driven at a speed which is faster than the first speed; and a step to determine a difference between the detected first and second amounts of displacement as vibration produced owing to the mass eccentricity of the disc.

7. The method of detecting vibration of a disc reproducing apparatus according to claim 6, further comprising a step to judge that the disc is abnormal based on the detected first displacement.

8. The method of detecting vibration of a disc reproducing apparatus according to claim 7, wherein the disc is forcedly ejected when it is judged abnormal.

9. The method of detecting vibration of a disc reproducing apparatus according to claim 7, wherein a user is notified that the disc is judged abnormal.

10. The method of detecting vibration of a disc reproducing apparatus according to claim 6, wherein the step to detect the first amount of displacement and the second amount of displacement includes:

a step to detect a zero crossing point of the tracking error signal output from the optical pickup to output a tracking error zero crossing signal;

a step to generate an envelope signal of the RF signal output from the optical pickup;

a step to generate a phase difference signal of the generated envelope signal and the tracking error signal; and a step to calculate the first amount of displacement or the second amount of displacement based on the tracking error zero crossing signal and the phase difference signal.

* * * * *